United States Patent
Frantz

(10) Patent No.: US 10,595,520 B1
(45) Date of Patent: Mar. 24, 2020

(54) FISHING ACCESSORY CONTAINER

(76) Inventor: Steven A. Frantz, Twin Lake, MI (US)

( * ) Notice: Subject to any disclaimer, the term of this patent is extended or adjusted under 35 U.S.C. 154(b) by 0 days.

(21) Appl. No.: 12/958,308

(22) Filed: Dec. 1, 2010

Related U.S. Application Data

(60) Provisional application No. 61/265,654, filed on Dec. 1, 2009.

(51) Int. Cl.
*A01K 97/06* (2006.01)
*A01K 97/04* (2006.01)

(52) U.S. Cl.
CPC .............. *A01K 97/06* (2013.01); *A01K 97/04* (2013.01)

(58) Field of Classification Search
CPC .. A21B 3/13; B65D 2517/285; B65D 25/285; B65D 17/00; A01K 97/05; A01K 97/06; A01K 97/04; A01K 97/08
USPC ...... 220/506, 503, 477, 23.88, 23.89, 23.87, 220/502, 527, 505, 740, 253, 254.6, 220/254.2, 255, 254.3, 225, 525, 524, 220/254.5, 522, 254.1, 256.1; 43/56, 55, 43/57
See application file for complete search history.

(56) References Cited

U.S. PATENT DOCUMENTS

| | | | |
|---|---|---|---|
| 2,954,891 A * | 10/1960 | Imber | B65D 81/3834 220/592.2 |
| 5,147,079 A * | 9/1992 | Heather | 224/148.6 |
| 5,319,877 A | 6/1994 | Hagan | |
| 5,385,259 A * | 1/1995 | Bernstein et al. | 220/495.11 |
| 5,386,922 A * | 2/1995 | Jordan | 220/23.83 |
| 5,388,729 A * | 2/1995 | Gerringer | A47G 19/14 215/6 |
| 5,413,261 A * | 5/1995 | Wu | A45F 3/14 215/396 |
| 5,417,338 A * | 5/1995 | Roy et al. | 220/23.86 |
| 5,755,057 A | 5/1998 | Dancer | |
| 5,967,315 A | 10/1999 | Langtry, II | |
| 6,357,169 B1 | 3/2002 | Gouge | |
| 6,460,287 B1 | 10/2002 | Louie | |
| 6,711,849 B1 | 3/2004 | Moretti | |
| 7,377,071 B1 * | 5/2008 | Thompson | 43/56 |
| D608,147 S * | 1/2010 | Sykes | D7/507 |
| D655,090 S * | 3/2012 | Puckett et al. | D3/327 |
| 2006/0006188 A1 * | 1/2006 | Williams | 220/826 |
| 2007/0241114 A1 * | 10/2007 | Roberts | 220/524 |
| 2008/0250697 A1 | 10/2008 | Wasnick | |

\* cited by examiner

*Primary Examiner* — Andrew T Kirsch
*Assistant Examiner* — Don M Anderson
(74) *Attorney, Agent, or Firm* — Stites & Harbison PLLC; Richard S. Myers, Jr.

(57) ABSTRACT

An accessory container that comprises an outer container and at lease one inner container resting therein. The outer container having an outside wall and a floor that define the outer container interior space; the inner container having an inside wall and an outside wall and a floor, the inside wall and the outside wall defining an inner container interior space, and the inside wall and the outside wall defining a aperture to allow access from the outside of the accessory container to the outer container interior space; and a lid that covers at least a portion of the inner container.

8 Claims, 8 Drawing Sheets

FISHING ACCESSORY CONTAINER

PRIOR APPLICATIONS

This application claims benefit U.S. Patent Application No. 61/265,654, filed Dec. 1, 2009, the contents of which are incorporated herein by reference in their entirety.

BACKGROUND AND SUMMARY OF THE INVENTION

The present invention relates generally to fishing equipment and, more specifically, to a multi-chambered container that provides a means for segregating fishing equipment including at least one of bait, poles, live bait or caught fish, etc. The multi-chambered container may have an outer container for holding an amount of fluid therein that is segregated from "dry" equipment.

The present invention overcomes many shortcomings of the prior art by providing a multi-chambered container that is easy to transport and provides a simple means for segregating dry fishing equipment from live bait or caught fish.

One embodiment of the present invention is an outer container that has an inner container resting therein. The outer container has a lower storage space, or outer container interior space, that is below the floor of the inner container. The inner container comprises an open shoot, or aperture, to allow access to the lower storage space.

Another object of the present invention is to provide an accessory container that comprises an outer container and at lease one inner container resting therein. In this embodiment, the outer container has an outside wall and a floor that define the outer container interior space, and the inner container having an inside wall and an outside wall and a floor, the inside wall and the outside wall defining an inner container interior space, and the inside wall and the outside wall defining a aperture to allow access from the outside of the accessory container to the outer container interior space. Also, in this embodiment the accessory container is covered by a lid. In some embodiments, the lid is completely removable from the accessory container.

In another embodiment, the lid has an aperture that corresponds with the inner container aperture to allow access to the outer container interior space while the lid is closed.

In another embodiment, the lid aperture that corresponds with the the inner container aperture is larger than the inner container aperture to provide access to the outer container interior space and the inner container interior space from outside the container.

Typically, but not always, the outer container interior space is defined by the difference in height of the outer container floor and the inner container floor when the inner container is resting in the outer container.

In yet another embodiment, there may be multiple inner containers that provide multiple inner container interior storage spaces.

In lid aperture that corresponds with the at least one interior and outer containers have multiple walls that form multiple storage clambers within their respective interior spaces.

All embodiments of the present invention may include a carrying strap or handle to ease transportation.

The foregoing and other objects and advantages will appear from the description to follow. In the description reference is made to the accompanying drawings, which form a part hereof and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DESCRIPTION OF EMBODIMENTS OF THE PRESENT INVENTION

As stated above, embodiments of the present invention include multi-chambered containers providing a simple means for segregating different fishing equipment and/or live fish.

Figure 1:
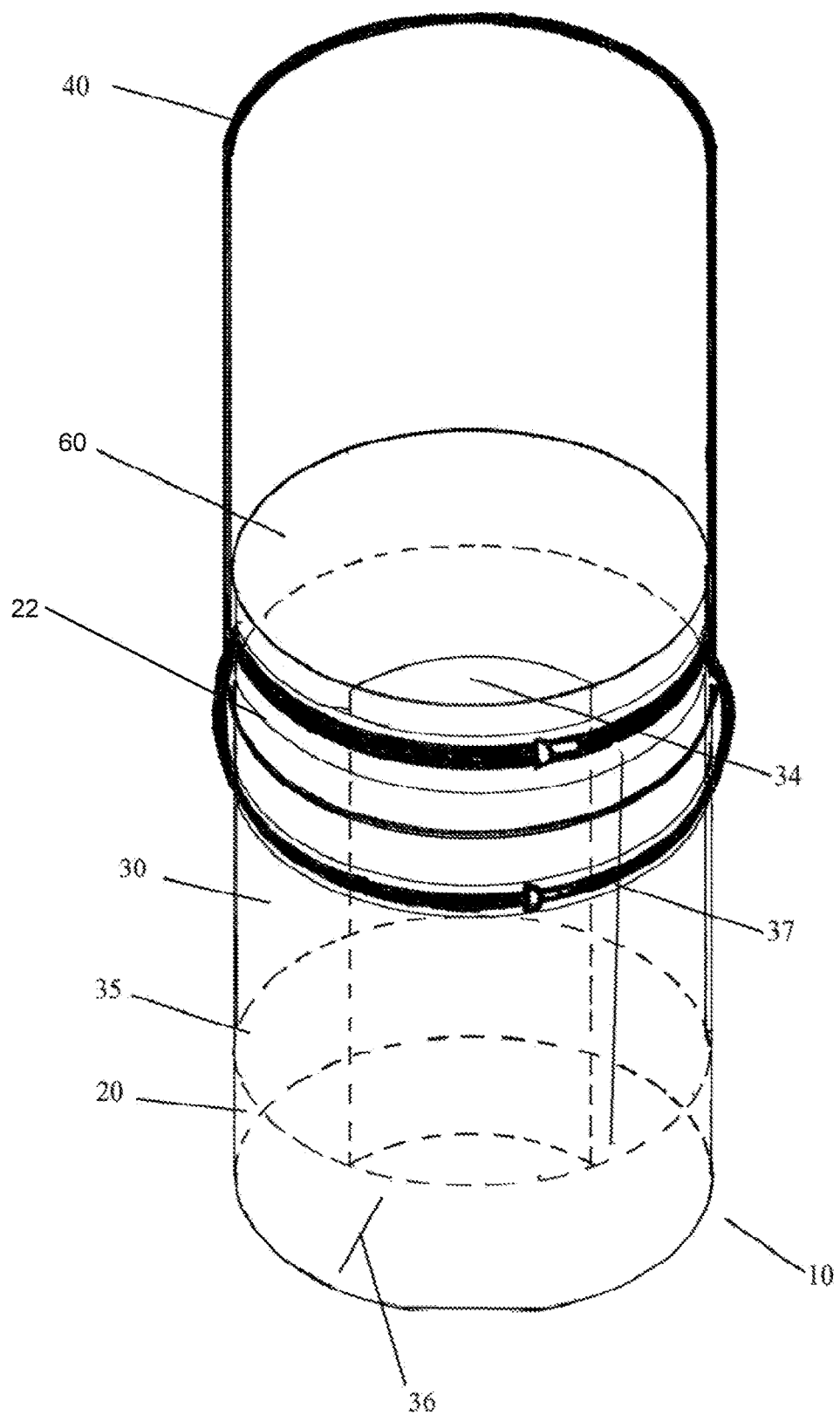
FIG. 1 is a perspective view of the embodiment of the present invention.

In FIG. 1, an embodiment 10 of the invention is shown. This embodiment shows the outer container 20 that comprises walls and a floor 23. Received by the outer container is an inner container 30 which also comprises an inner container floor 35 and outer walls. The outer walls form an open shoot 34 which provides access to a lower storage space 36. Generally, the lower storage space is formed by the difference in height between the inner container floor 35 and the outer container floor 23. The top of the inner container and the floor of the inner container provide an upper storage space 37.

In the embodiment shown, the inner container is received by the outer container by being placed therein and resting upon the top of the outer container.

The outer and inner containers may snap together as an example of being received by one another. Alternatively, they may be held together from the friction of the outer walls as the result of a snug fit. Also, the containers may simply rest upon one another.

Also as shown in FIG. 1, when the inner container rests in the outer container, the tops of the containers may form ridges, rows, etc., to receive a shoulder strap 40 that can be used to transport the container 10 of the present invention.

Figure 2:
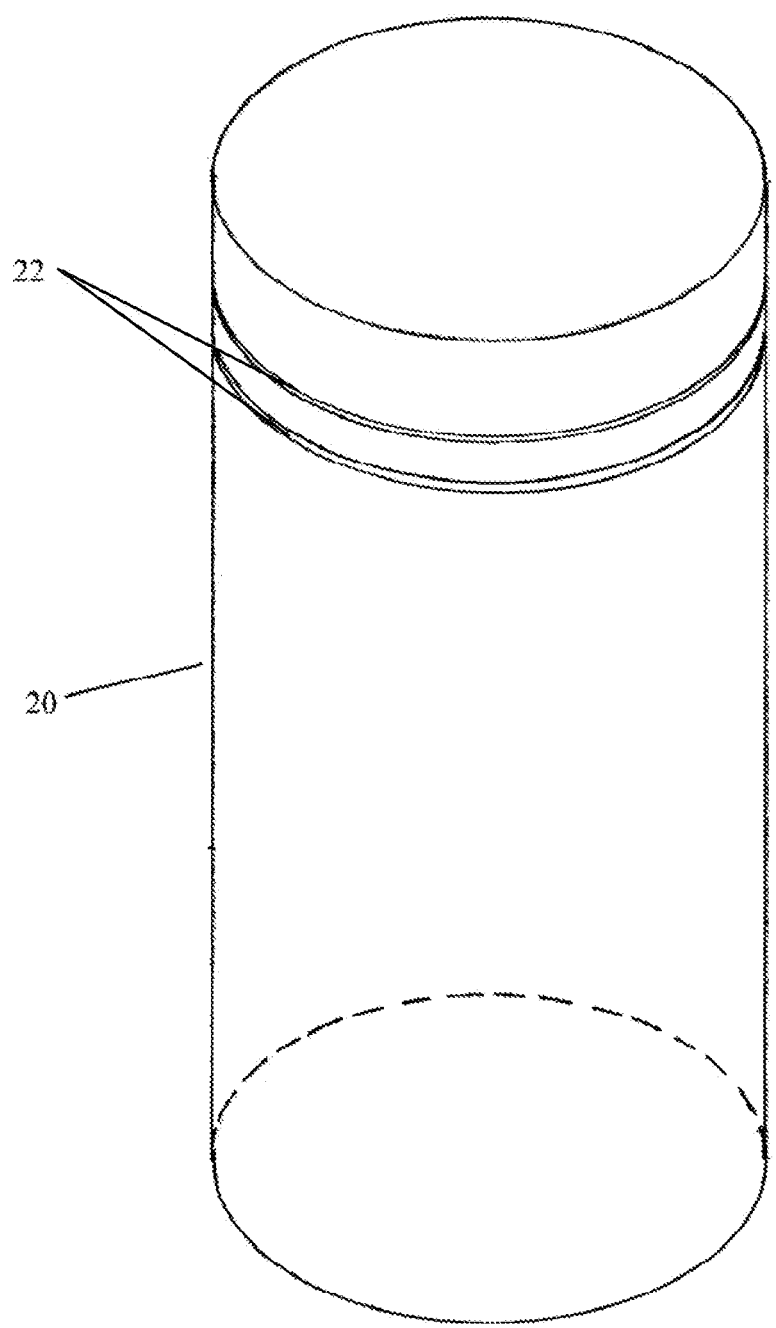
FIG. 2 is a perspective view of an embodiment of the outer container.

FIG. 2 shows an additional view of the outer container 20. As seen in FIG. 2, the outer container contains a floor 23 which forms the bottom portion of the lower storage space. The top of the container contains ridges 22 that can be used to secure a shoulder strap or other means for transporting the fishing accessory container of the present invention.

Figure 3:
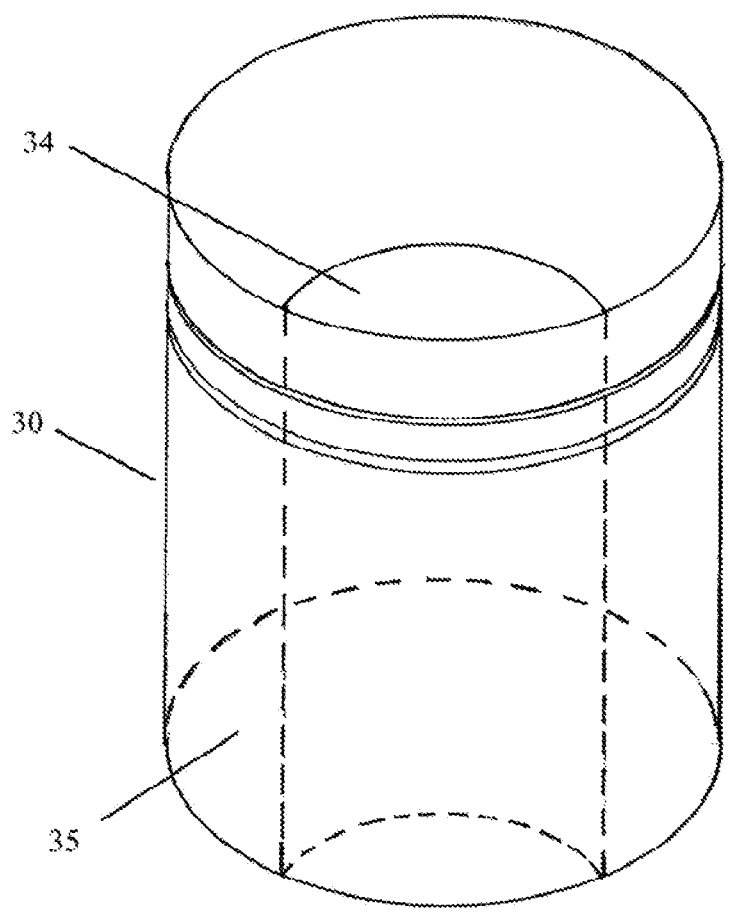
FIG. 3 is a perspective view of an embodiment of the inner container.

FIG. 3 shows an embodiment of the inner container of the present invention.

Typically, the inner container can be used for dry storage. As shown in FIG. 3, the inner container 30 includes a floor 35 and walls that form an open shoot 34 into the outer container.

As indicated herein, additional embodiment comprise more than one inner container.

Figure 4:
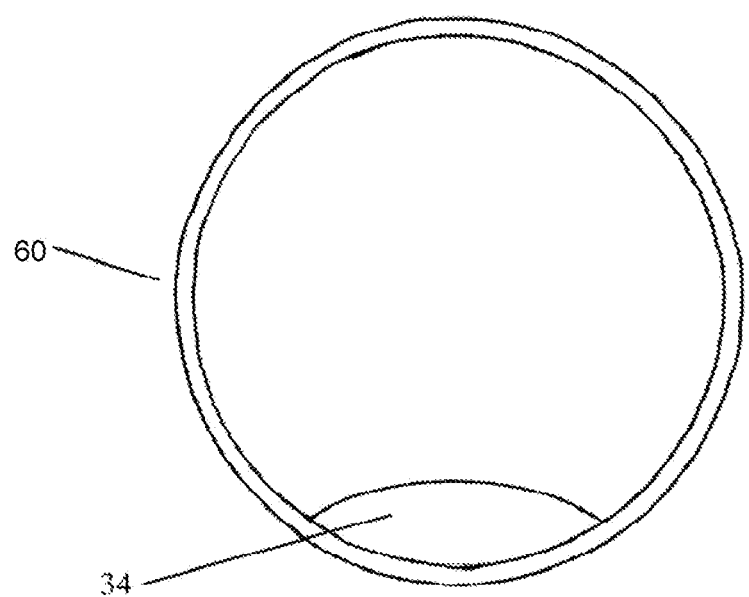
FIG. 4 is a top view of an embodiment of the inner container.

An embodiment of the open shoot containing access to the outer container is also shown in FIG. 4.

Figure 5:
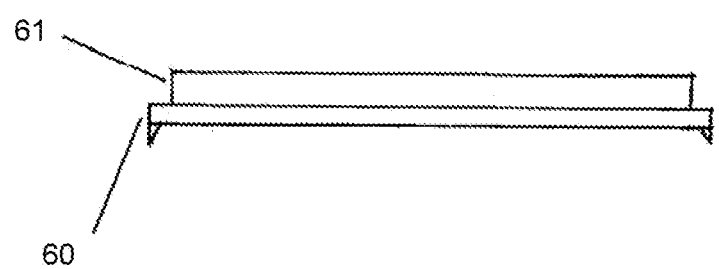
FIG. 5 is a top view and side view of an embodiment of a lid for the inner container.

FIG. 5 shows an embodiment of a lid (60) that can be used in connection with the fishing container of the present invention. Generally, the lid will be placed on the upper container. The lid may also comprise an open shoot that corresponds with the opening in the inner container. This allows access to the outer container even when the lid is on the container. In other embodiments, the lid opening may be larger than the size of the shoot. This allows access to both the inner container storage area and at the same time allowing access to the outer container storage area. As shown in FIG. 5, the lid may additionally comprise padding (61), and in the embodiment shown, the lid is a simple snap-on lid that is easily securable to the container. Of course, other versions of the lid can also be incorporated, particularly with respect to the means for attachment. One example is a permanently attached lid that includes a hinge for opening and closing.

Figure 6:
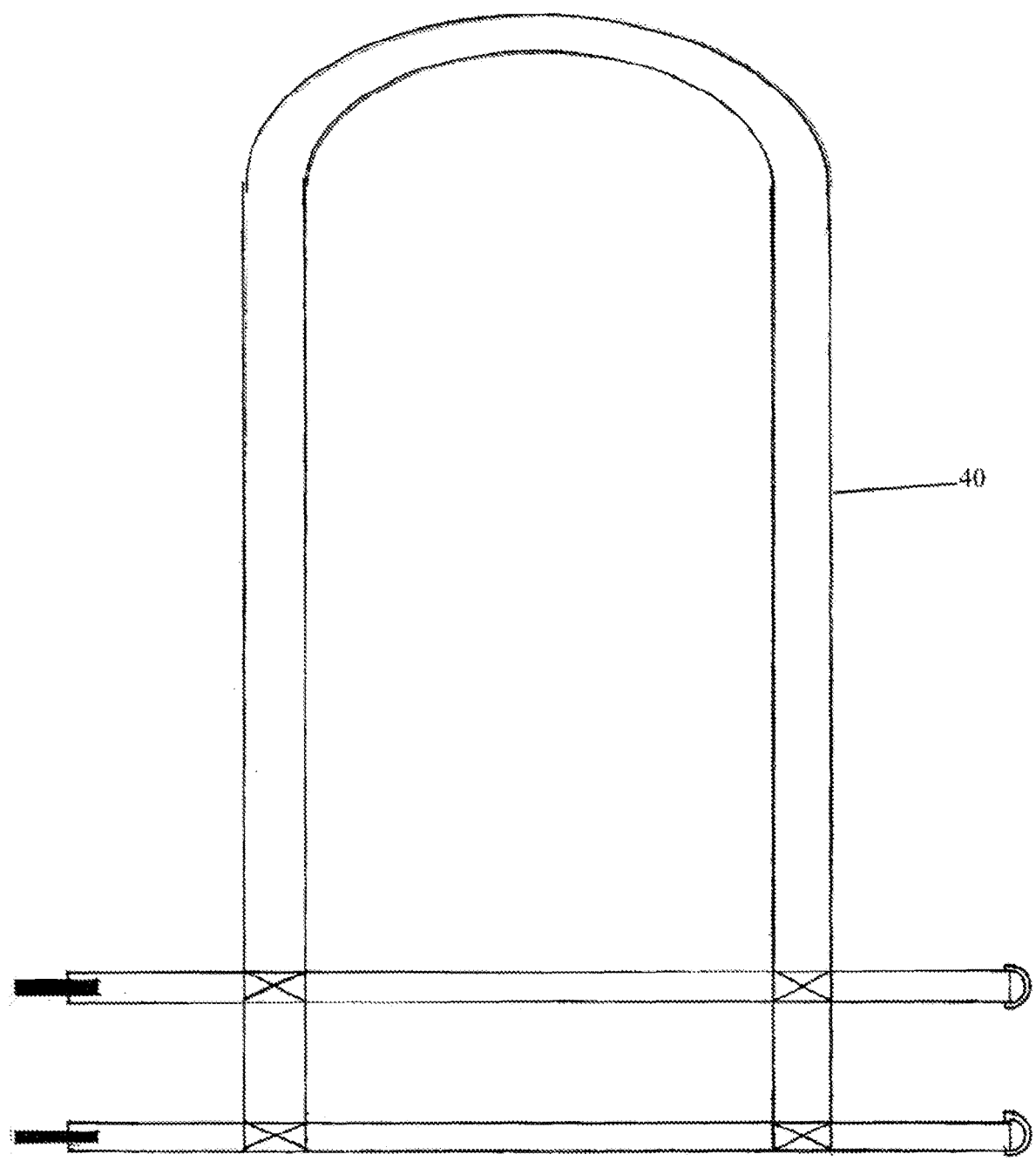
FIG. 6 shows an example of shoulder straps that could be used with embodiments of the present invention.
Figure 7:
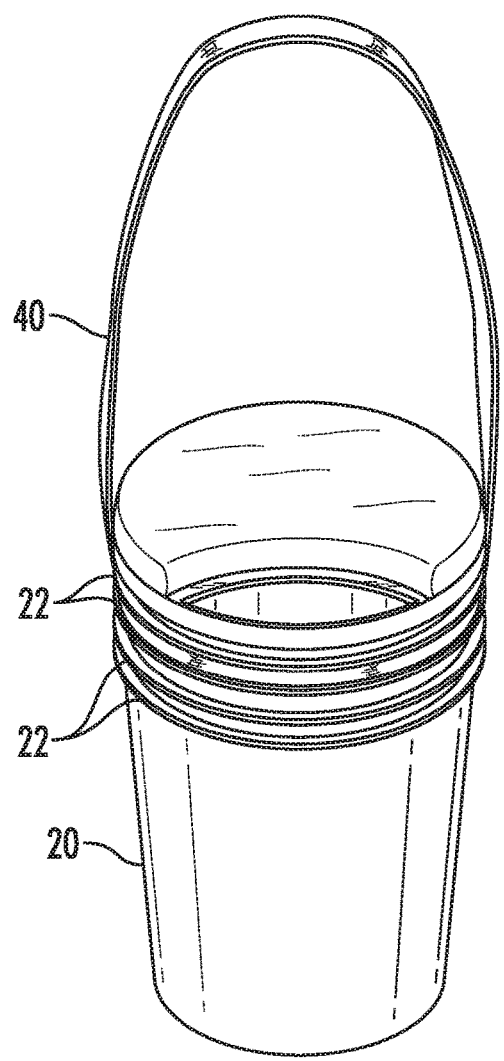
FIG. 7 shows an embodiment of the present invention wherein the inner container is resting within the outer container.
Figure 9:
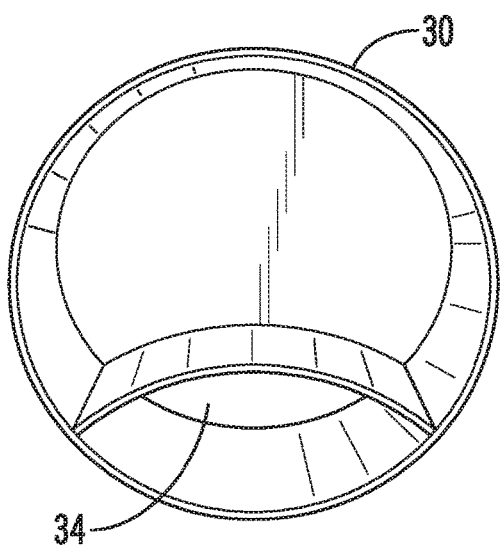
FIG. 9 shows an embodiment of the inner container.
Figure 8:
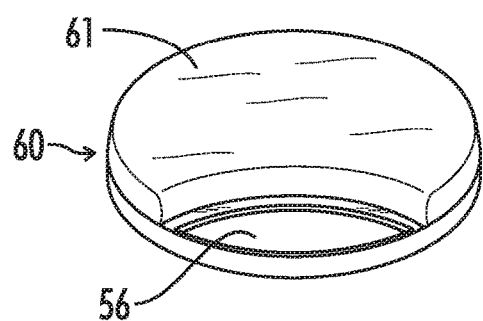
FIG. 8 shows an embodiment of the lid.
Figure 10:
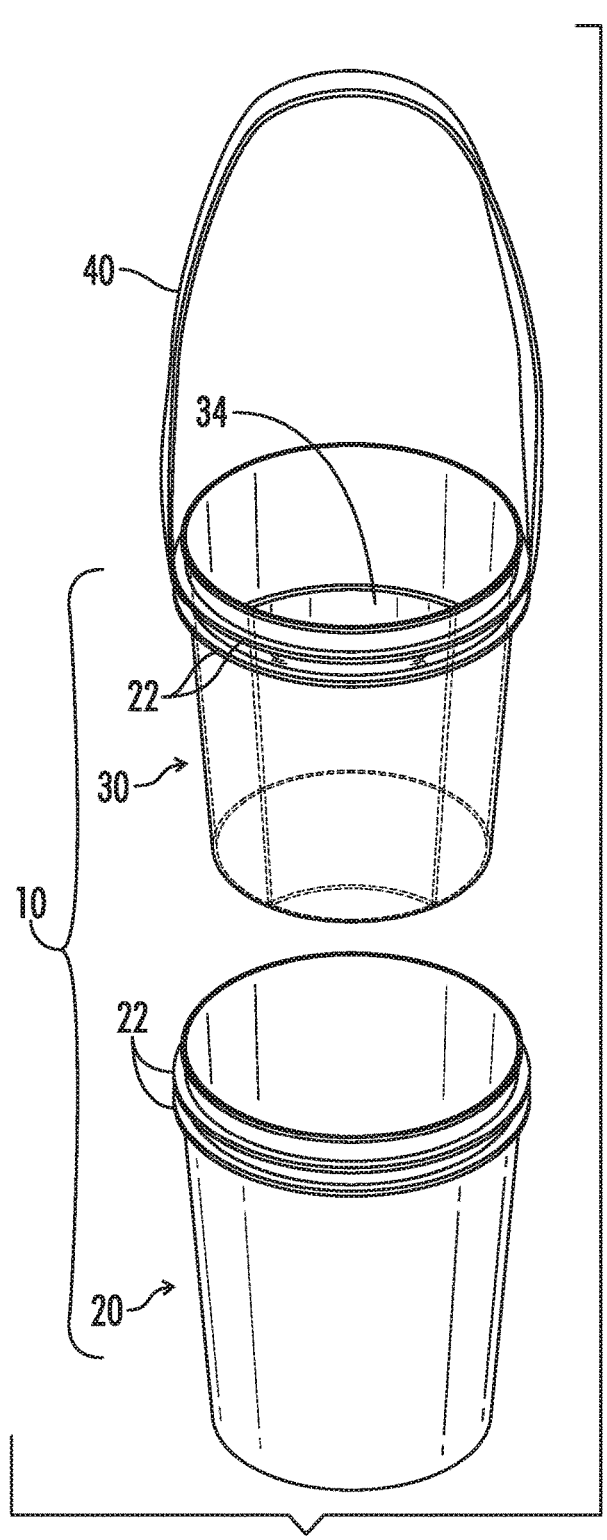
FIG. 10 shows a view of the present invention where the inner container is in position to be inserted into the outer container.
Figure 11:
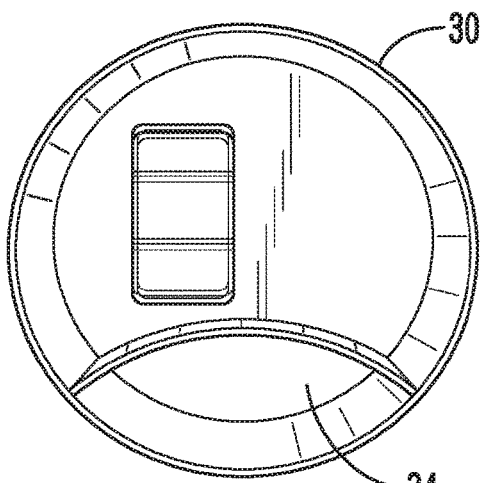
FIGS. 11, 12, and 13 show views of the inner container.
Figure 12:
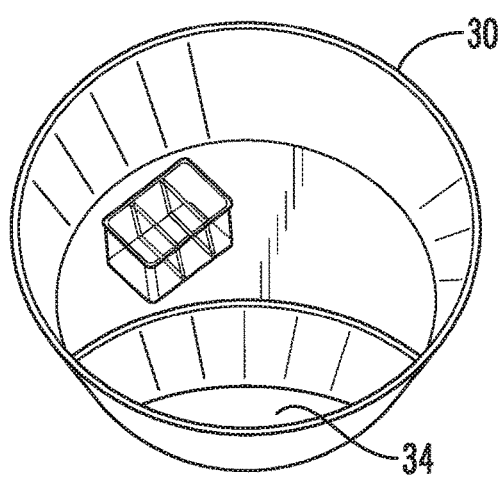
Figure 13:
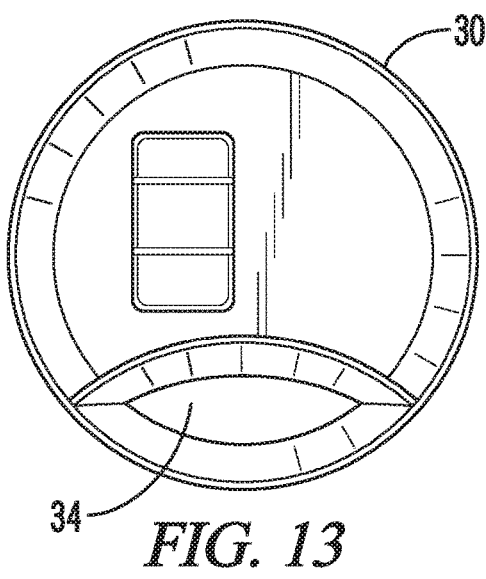
Figure 14:
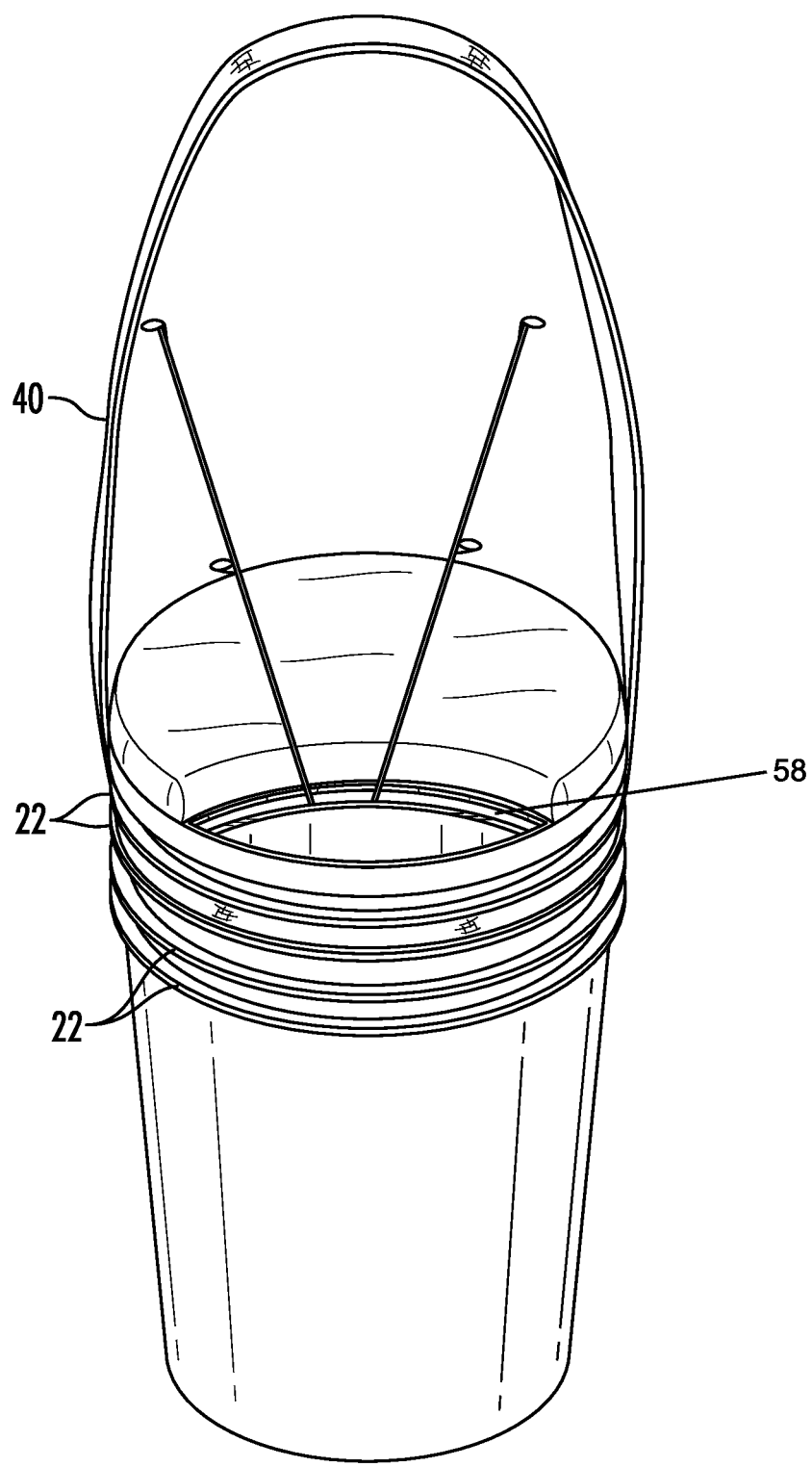
FIG. 14 show an embodiment of the present invention wherein the lid aperture is larger than the inner container shoot.

FIG. 6 shows an embodiment of a shoulder strap 40 that can be used in connection with the present invention. As shown in the figure, the shoulder strap contains bands 41, 42 that attach around both containers.

Also, embodiments of the present invention may include insulation in or around at least the lower storage space. An example of this insulation may be Styrofoam. Additionally, the lower container and/or the lower storage space may contain a series of ventilating holes. These holes may also be closeable by rubber plugs, screws, etc.

The present invention may comprise certain indicia as well. For example, the lid or outer container may comprise indicia that could be used as a measuring device.

In typical embodiments, the upper storage space contains a shoot that allows access to the lower storage space through the top of the container. The upper storage space may also contain various segmented trays or compartments (38) for holding hooks, lures, weights, knives, etc., that can be easily arranged and available to the fisherman.

In other embodiments, various numbers of containers may be used. For example, two, three, four, or five containers may be used to provide various storage compartments.

The invention, thus, being described, one of ordinary skill in the art would recognize that modifications and variations are possible without departing from the teachings of the presently disclosed subject matter. This description, in particularly the specific details of the exemplary embodiments disclosed, is provided primarily for clearness in understanding and no unnecessary limitations are to be understood there from, from modifications and other embodiments will become evident to those skilled in the art upon reading this disclosure and may be made without departing from the spirit and scope of the claimed subject matter.

I claim:

1. An accessory container, comprising:
   an outer container (20) and at least one inner container (30) therein;
   the outer container having an outer container outside wall (50) and an outer container floor (23) that define the outer container interior space (36);
   the inner container having an outer circumference wall (53) that engages an inner container floor (35) and an inside wall (52) that engages with and makes a closed volume with the outer circumference wall and engages the inner container floor, the inside wall and the outside wall defining an inner container interior space and an open shoot (34), with the open shoot allowing communication from the outside to the outer container interior space while the containers are engaged;
   wherein the inner container and the outer container contain circumferential ridges around their top;
   wherein the inner container open shoot (34) allows access from the outside of the accessory container to the outer container interior space;
   wherein the ridges of the inner container rest above the ridges of the outer container when resting therein; and
   the accessory container comprising a lid (60) that covers at least a portion of the inner container, wherein the lid has a lid opening (56) that corresponds with open shoot to allow access to the outer container interior space while the lid is closed, and wherein the lid opening is larger than the open shoot, to expose both the open shoot and the inner container interior space, providing access to the outer container interior space and the inner container interior space from outside the container.

2. The container of claim 1, wherein the lid closes by a fastener (62).

3. The container of claim 1, wherein the lid comprises a cushioned top surface (61).

4. The container of claim 1, wherein the lid is securable to the inside container or in the absence of the inside container, the outside container.

5. The container of claim 1, wherein the outer container interior space is defined by the difference in height (h) of the outer container floor and the inner container floor when the inner container is resting in the outer container.

6. The container of claim 1, wherein the outer container and inner container are removably held together by friction of their walls engaging one another.

7. The container of claim 1, further comprising a shoulder carrying strap engaging and secured by the ridges of the inner container and the outer container.

8. The container of claim 1, wherein the inner container interior space has multiple interior walls (57) that form multiple storage chambers within the inner container interior space.

\* \* \* \* \*